US009137157B2

(12) United States Patent
Chen et al.

(10) Patent No.: US 9,137,157 B2
(45) Date of Patent: *Sep. 15, 2015

(54) PACKET DATA COMMUNICATIONS

(75) Inventors: Xiabao Chen, Swindon (GB); Martin Barkley Harris, Bristol (GB)

(73) Assignee: ORANGE SA, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,286

(22) Filed: Sep. 13, 2012

(65) Prior Publication Data

US 2013/0089095 A1 Apr. 11, 2013

Related U.S. Application Data

(63) Continuation of application No. 10/567,701, filed on Feb. 3, 2006, now Pat. No. 8,289,957.

(51) Int. Cl.
*H04L 12/741* (2013.01)
*H04L 12/701* (2013.01)
*H04W 80/04* (2009.01)
*H04L 29/06* (2006.01)

(52) U.S. Cl.
CPC .............. *H04L 45/74* (2013.01); *H04L 45/00* (2013.01); *H04L 69/16* (2013.01); *H04L 69/161* (2013.01); *H04L 69/22* (2013.01); *H04W 80/04* (2013.01)

(58) Field of Classification Search
CPC ....... H04L 45/741; H04L 47/10; H04L 47/14; H04L 47/2241; H04L 49/9078; H04L 47/32; H04L 47/56; H04L 47/28
See application file for complete search history.

(56) References Cited

U.S. PATENT DOCUMENTS

| 6,466,985 | B1 | 10/2002 | Goyal et al. |
| 6,845,100 | B1 * | 1/2005 | Rinne ...................... 370/395.43 |
| 6,915,325 | B1 | 7/2005 | Lee et al. |
| 7,522,601 | B1 * | 4/2009 | Morrow ........................ 370/392 |
| 2002/0181468 | A1 | 12/2002 | Lucidarme et al. |
| 2006/0268819 | A1 | 11/2006 | Chen et al. |
| 2013/0089095 | A1 * | 4/2013 | Chen et al. .................... 370/392 |

OTHER PUBLICATIONS

3G TR 23.923 V.3.0.0 (May 2000), XP-002282368, 3rd Generation Partnership Project; Technical Specification Group Services and System Aspexts; Combined GSM and Mobile IP Mobility Handling in UMTS IP CN (3G TR 23.923 version 3.0.0).
XP-002170897; "IPv6 Router Alert Option", Network Working Group, Oct. 1999, pp. 1-6.

* cited by examiner

*Primary Examiner* — Jae Y Lee
(74) *Attorney, Agent, or Firm* — Haverstock & Owens LLP (57) ABSTRACT

An internet packet comprises a header field including a field identifying a source address of the internet packet, a field identifying the destination address of the internet packet and a next header field identifying whether an extension header follows the header and a type of the extension header. The extension header indicates a hop-by-hop option header including a router alert option header type indicating that the extension field is optional for a router to read, and a field providing information for a gateway support node of a packet radio system network. A gateway support node is provided with information, which may be required for example to support a mobile internet protocol (IP). By providing the router alert option field, a router is not required to read the remainder of the hop-by-hop option field.

13 Claims, 10 Drawing Sheets

DOWN-LINK INTERNET PACKET (MN → CN)

UP-LINK INTERNET PACKET (CN → MN)

| Version 601 | Traffic Class 602 | Flow Label 604 |
|---|---|---|
| Payload Length 606 | Next Header Hop-by-hop option = "0" | Hop Limit 608 |
| Source Address 612 | | |
| Next Header 616 | Header Extension Length 620 | Router Alert Value = "0" 622 | Hop-by-hop option type, Value = "5" 624 | Destination Address 614 | Value = "2" or "3" For GGSN Mobility 626 } 618 |
| Source / Destination Home Address of Mobile Node 628 | | |

PACKET DATA COMMUNICATIONS

RELATED APPLICATION(S)

The present application is a continuation of co-pending U.S. patent application Ser. No. 10/567,701, filed Feb. 3, 2006, and entitled "PACKET DATA COMMUNICATIONS," which is hereby incorporated by reference.

FIELD OF THE INVENTION

The present invention relates to internet packets which are communicated in accordance with an interne protocol to provide an internet packet data communications system.

In some embodiments the internet packet may find application with the Ipv6 internet protocol providing mobile Internet Protocol (IP) functions.

More particularly, embodiments of the present invention find application in packet data communications systems, which include packet radio networks. In one embodiment the packet data network operates in accordance with the General Packet Radio Service (GPRS) standard.

BACKGROUND OF THE INVENTION

GPRS has been developed to communicate efficiently packets of data to and from mobile nodes using either a 2G (for example GSM) or 3G (for example UMTS) mobile radio network. GPRS provides support for a packet-orientated service, which attempts to optimise network and radio resources when communicating data packets such as for example internet data packets.

Generally, the GPRS network will be connected to another packet data telecommunications network, which may also be connected to further packet data telecommunications networks. The GPRS network includes a gateway support node (GGSN) which provides an interface between an external packet data communications network and nodes attached to the GPRS network and provides a plurality of bearers for communicating internet packets with the nodes.

The Internet Protocol as developed by the Internet Engineering Task Force (IETF) has become a preferred way of communicating packet data via telecommunications networks. Whilst version 4 of the Internet Protocol (Ipv4) has been standardised and has been deployed in many fixed networks, version 6 of the Internet Protocol is being developed in order to provide improved facilities. Amongst these improved facilities is a facility to communicate data packets to and from mobile nodes, which roam from a home network to a foreign network during an IP session [1]. Generally, following a process known as route optimisation which will be described shortly, a source and a destination address in the header of IP data packets being sent from and to a Mobile Node (MN) respectively will change as a result of the MN roaming to the foreign network.

The MN may be communicating IP data packets with a Correspondent Node (CN) which is attached to a GPRS network, then the GGSN of the GPRS network must be arranged to route the IP data packets via an appropriate bearer to the CN (which itself may be mobile). If the MN roams to a foreign network mid-session then the GGSN must be arranged to route the IP data packets to the CN (mobile user equipment) via the appropriate bearer. The appropriate bearer will have been set up by the GGSN when a session initiation was established at a time when the MN was attached to its home network. As such the parameters for the bearer will have been established with reference a home address of the MN as the source address. However as explained above, the source address in the header of the IP data packets will be changed during the session from the home address of the MN, when attached to its home network, to a care-of-address after the MN roams to the foreign network.

It has previously been proposed in co-pending UK patent application numbers 0226289.7, 0222187.7, 0230336.0, 0222161.2 and 0230335.2 to provide a mobile node's home address in an extension header field in IPv6 known as the hop-by-hop field. As such the GGSN will be able to identify the appropriate bearer through which IP data packets can be routed to a correspondent node (CN) attached to the GPRS network, because the MN's home address provides the source address with respect to which the appropriate bearer was set up. However according to the Ipv6 standard, if the hop-by-hop field option is selected then every router along a communications path followed by the internet data packets from an MN to the CN is required to read the mobile's home address in the hop-by-hop field. This requirement could represent a reduction in performance of a network formed by the routers, as a result of the router reading the mobile's home address although this address may not be relevant to the router.

SUMMARY OF INVENTION

According to the present invention there is provided an internet packet comprising a header field, the header field including a field identifying a source address of the internet packet, a field identifying the destination address of the internet packet and a next header field identifying whether an extension header follows the header and a type of the extension header. The extension header indicates a hop-by-hop option header, the hop-by-hop extension header including a router alert option header indicating that the extension field is optional for a router to read, and a field providing information for a gateway support node of a packet radio system network.

As explained in our co-pending UK patent application number 0226289.7, by providing a home address of a mobile node in the hop-by-hop extension header field, inter-working between a gateway support node of a packet radio network and a data communications network when supporting mobile IP functions can be provided. However, if every router in a communications path between a mobile node and a correspondent node is required to read all the data in the hop-by-hop extension header, then a substantial reduction in performance to a network formed by the routers may occur. By providing a router alert option field in the hop-by-hop extension header, a relatively short indication that the hop-by-hop field is providing information to a gateway support node is made and therefore does not need to be read by a router. As a result any loss in performance caused by a router having to read the entire hop-by-hop field can be substantially reduced.

In some embodiments the internet packet is formed in accordance with the Ipv6 specification, the routers and the packet radio network being operable to support the Ipv6 specification. As such, according to the Ipv6 Router Alert Option standard the first three bits of the router alert option field are set to be zero, any router which does not recognise this Router Alert Option type will skip the information in the hop-by-hop field. For some applications (explained below) the remainder of the hop-by-hop extension header field may include at least a 128-bit address. According to the IP Ipv6 specification defined at www.ietf.org/rfc/rfc2460.txt [3], the hop-by-hop extension header field must be read and processed by every node along a packet's communication path. If a node or router is only required to read a relatively short field (three bits) indicating that the rest of the message is only relevant to a gateway support node of a packet radio network, then a performance penalty for having to read the hop-by-hop extension header will be relatively small with respect to having to read the entire hop-by-hop field.

In one example, the gateway support node establishes a packet data bearer for communicating internet packets from a mobile node across a packet radio network to a CN attached to the network in accordance with a source address of the internet packets when an IP session was set up. If the source address of internet packets in the basic Ipv6 header changes during the session as a result of the mobile node roaming to a foreign network, the gateway support node will not recognise the source address and will drop the internet packets. The original source address (home address) which was used to establish the bearer across the packet radio network, is known as the home address. By providing the home address in the hop-by-hop extension header the gateway support node will be able to identify the appropriate bearer even though the source address of the internet packet in the basic Ipv6 header will have changed to a care-of-address not known to the gateway support node.

Various further aspects and features of the present invention are defined in the appended claims. These include a gateway support node, a router and a method of communicating internet packets.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF THE PREFERRED EMBODIMENTS

Mobile Packet Radio Network Architecture

Figure 1:
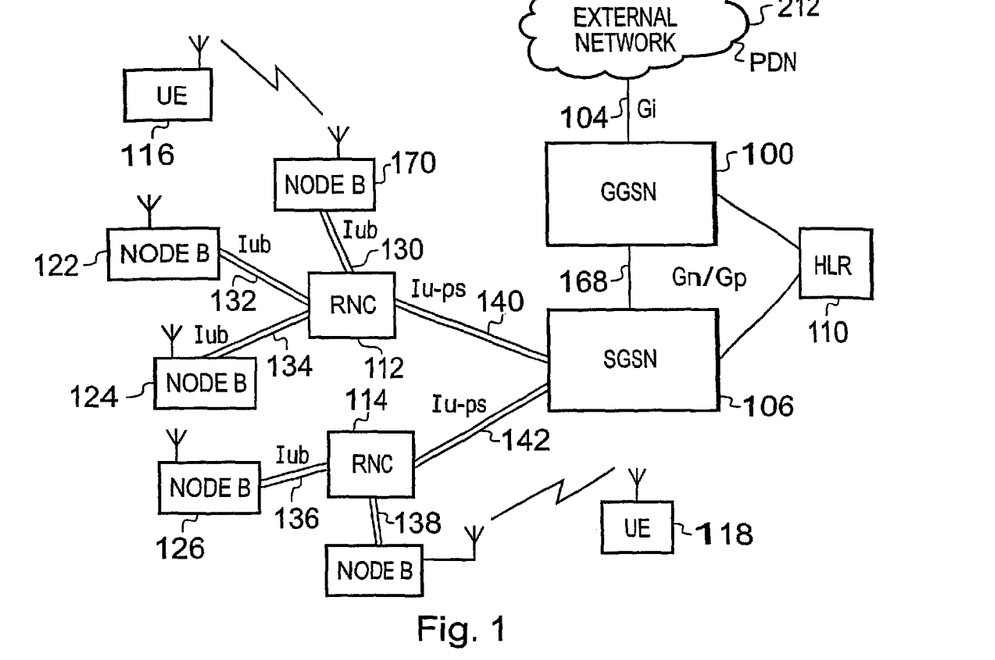
FIG. 1 schematically illustrates an example architecture of a mobile radio network which is arranged to support packet data communications.

An example architecture of a packet radio network which is arranged to support packet data communications is provided in FIG. 1 and explained in more detail in Annex 1. To assist in understanding and explaining the embodiments of the present invention and the advantages provided by such embodiments, a brief description will be provided here. The packet radio network presented in FIG. 1 illustrates an arrangement which conforms to the GPRS/UMTS standard and provides a packet radio network for communicating internet data packets with nodes which are attached to the network via terrestrial radio bearers referred to as UTRAN. The packet radio network includes a Gateway GPRS Support Node (GGSN) which is operable to provide an interface between an external network PDN and the nodes attached to the GPRS/UMTS network. Since the nodes are communicating via the UTRAN radio interface they may be generally mobile nodes. However in the following description the mobile user equipment (UE) which are attached to the packet radio network will be referred to as correspondent nodes CN. As will be explained shortly, the GPRS/UMTS network provides a plurality of packet data bearers for communicating internet packets from the GGSN to the correspondent nodes CN and from the correspondent nodes CN to the GGSN. Typically, packets received from correspondent nodes by the GGSN are allowed to egress from the packet radio network to the external packet communications network PDN. These packets may be destined for other nodes which may be attached to the external network PDN or may be attached other networks, the packets reaching these nodes via the external network PDN.

Mobile Ipv6 Route Optimisation

Route optimisation is a known as part of the internet protocol mobility standard version 6 (MIPV6) and may be performed for a node which roams from a home network to a foreign network. The route optimisation is a process by which a node, which changes its affiliation from a home network to a foreign network, can be arranged to communicate internet packets to and from the node via the foreign network without being routed via the home network and without requiring a home agent as is the case for Ipv4. A node which changes its affiliation by roaming from its home network to a foreign network will be referred to in the following description as a mobile node.

Figure 2:
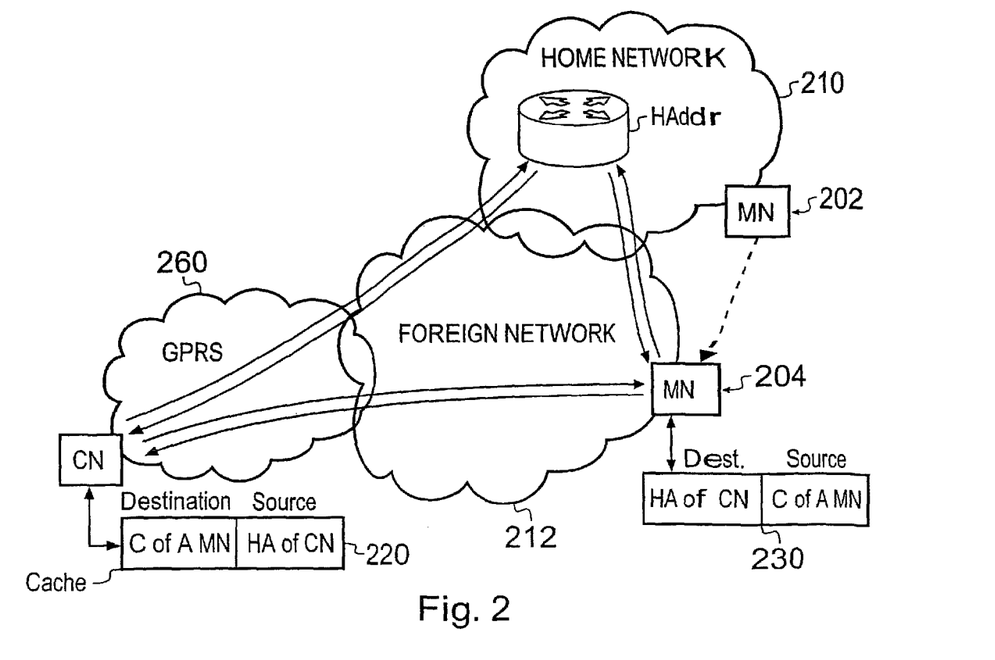
FIG. 2 schematically illustrates a mobile node communicating with a correspondent node via a home network and after roaming to a foreign network performing a route optimisation procedure.

As is conventional with the internet protocol, nodes which communicate internet packets between each other provide the destination address as well as the source address in the basic internet packet header. FIG. 2 provides an illustration of a route optimisation process between a correspondent node CN attached to a GPRS network and a mobile node MN. In FIG. 2 the correspondent node CN is communicating internet packets to and from the mobile node MN whilst the correspondent network MN is affiliated with a GPRS/UMTS network 200. As illustrated by two positions of the mobile node MN 202, 204, the mobile node which was originally communicating internet packets with the correspondent network CN via its home network 210 moves to a foreign network 212.

Thus originally the mobile node MN was communicating internet packets via its home agent HA. When the mobile node MN moves from the home network 210 at position 202 to a foreign network 212 at position 204 internet packets according to a conventional operation of Ipv4 would have to be routed via the home agent. That is to say the destination address for packets sent to the mobile node MN would be its home address, and the source address of packets sent from the mobile node MN would be its home address. As such, internet packets would have to be routed via the foreign network 212 and the home network 210 to and from the correspondent node CN via the GPRS/UMTS network 200. It will be appreciated that routing packets via the home agent after the mobile node MN has roamed to the foreign network consumes network resources unnecessarily and further increases the delay in communication of the internet packets.

As mentioned above, route optimisation is a process by which internet packets are communicated between the correspondent node CN and the mobile node MN without having to pass through the home agent HA thereby reducing the resources used to communicate the internet packets. Typically a delay in communicating packets is also reduced.

Figure 3:
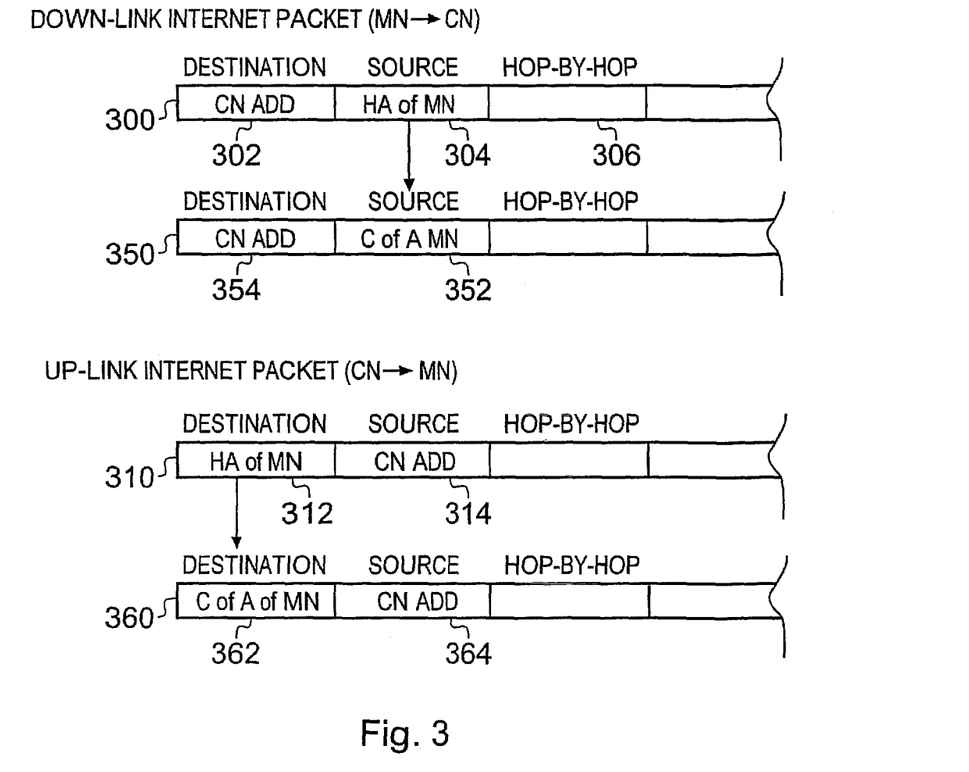
FIG. 3 schematically illustrates example internet packets at different stages in the route optimisation procedure.

FIGS. 2 and 3 effectively provide a summary of relevant parts of the route optimisation process, which will be useful in understanding the embodiments of the present invention, which will be described shortly. FIG. 3 provides an example illustration of Internet packet headers before and after route optimisation. In FIG. 3 internet packet 300 provides an illustration of an internet packet (Ipv6) header to be sent from the mobile node MN when attached to the home network at position 202 to the correspondent node CN when attached to the GPRS network 200. The Internet packet header 300 includes the address of the correspondent node CN within a destination field 302 and the home address of the mobile node (MN) within a source address field 304. The Internet packet header 300 also includes a further field known as the hop-by-hop field 306 which will be explained shortly. The IP packet 300 for communication from the mobile node (MN) to the correspondent node (CN) is known as a down-link internet packet.

For the up-link, that is to say from the correspondent node CN to the mobile node MN, an Internet packet header 310 is shown to include within the destination field 312 the home address of the mobile node MN and, within the source address field 314, the address of the correspondent node CN.

Following route optimisation in accordance with a change of affiliation of the mobile node, the mobile node MN must inform the correspondent node of its new address. The new address, that is the address to be used to access the mobile node MN via the foreign network, is known as the care-of-address. To inform the correspondent node CN of the care-of-address of the mobile node MN, the mobile node MN sends the correspondent node CN a binding update message.

Following the binding update the internet packet header for the down-link 350 now includes the care-of-address of the mobile node MN in the source field 352. Correspondingly, the destination field, of the internet packet sent to the mobile node MN contains the care-of-address of the mobile node in the internet packet header 360.

Should the CN itself change its affiliation either within the network or to a foreign network then correspondingly a binding update would be performed by the correspondent node CN. As illustrated in FIG. 2 the cache address store of the mobile node 230 is then updated to include the care-of-address of the correspondent node CN in association with the address of the correspondent node CN with the effect that subsequent Internet packets use the care-of-address of the correspondent node CN in place of the home address of the correspondent node.

Functions of the GGSN

Figure 4:
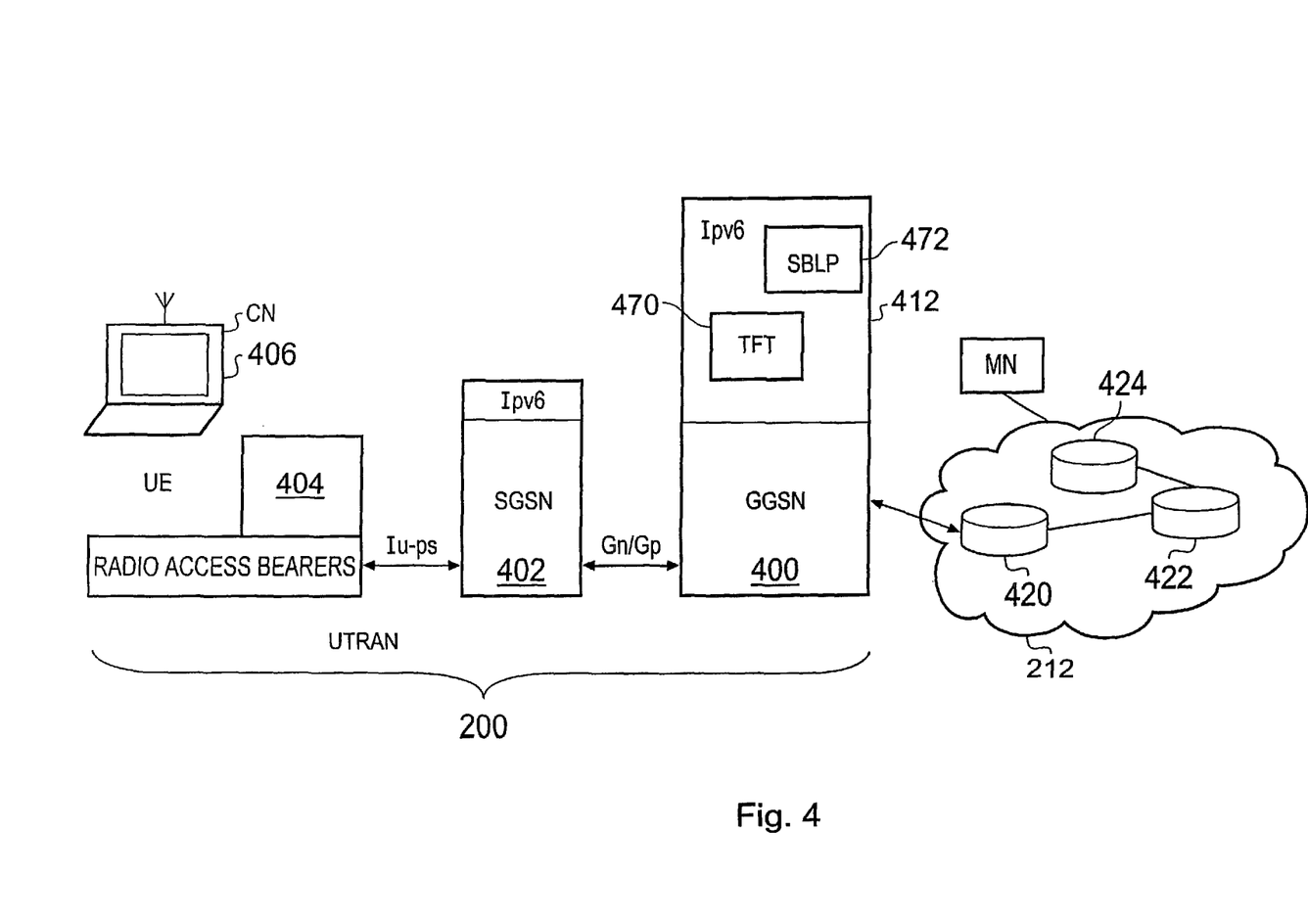
FIG. 4 provides a schematic illustration of parts of a packet radio communications network.

An example embodiment of the present invention will now be described with reference to FIG. 4 which provides elements forming part of the GPRS/UMTS network which appears in FIG. 2. In FIG. 4 a gateway support node (GGSN) 400 is shown together with a Serving GPRS Support Node (SGSN) 402 and a Universal Terrestrial Radio Access Network part (UTRAN) 404. The GGSN 400, the SGSN 402 and the UTRAN 404 form part of the packet radio network as represented in FIG. 1 for communicating data packets to and from mobile User Equipment (UE) 406, which for the illustrative explanation forms the correspondent node CN. The UTRAN 404 includes RNCs and Node Bs as represented in FIG. 1 and provides a facility for communicating packets via a radio access interface formed by the Node B with the UE 406.

As will be appreciated in the up-link direction, that is from the correspondent node CN 406 to the GGSN, corresponding tunnelling is employed to route the Internet packets back to the GGSN so that the internet packet can egress from the GPRS/UMTS network 200 to the foreign network 212. As shown in FIG. 2 a communication path from the MN to the GGSN 400 includes several routers 420, 422, 426 within the foreign network 212.

Also included within the GPRS/UMTS elements shown in FIG. 4 in the GGSN 400 is a Traffic Flow Template (TFT) controller 470 and a Service Based Policy (SBLP) controller 472. The TFT 470 and the SBLP 472 operate in accordance with an embodiment of the present invention as will be described shortly to manage the communication of IP data packets from the GGSN to the mobile UE (CN) and from the mobile UE (CN) to the GGSN and outward to the foreign network 212.

In the following description the mobile UE 406 forms the correspondent node CN as represented in FIG. 2, whereas a node from which the UE 406 receives internet data packets and sends internet data packets to forms a mobile node which roams to the foreign network 212 as explained with reference to FIG. 2.

In order to provide an explanation of the embodiments of the present invention the operation of the TFT controller 470 which is shown in FIG. 4 will be briefly described with reference to FIG. 5.

Traffic Flow Template (TFT Based Packet Filtering at the GGSN)

Figure 5:
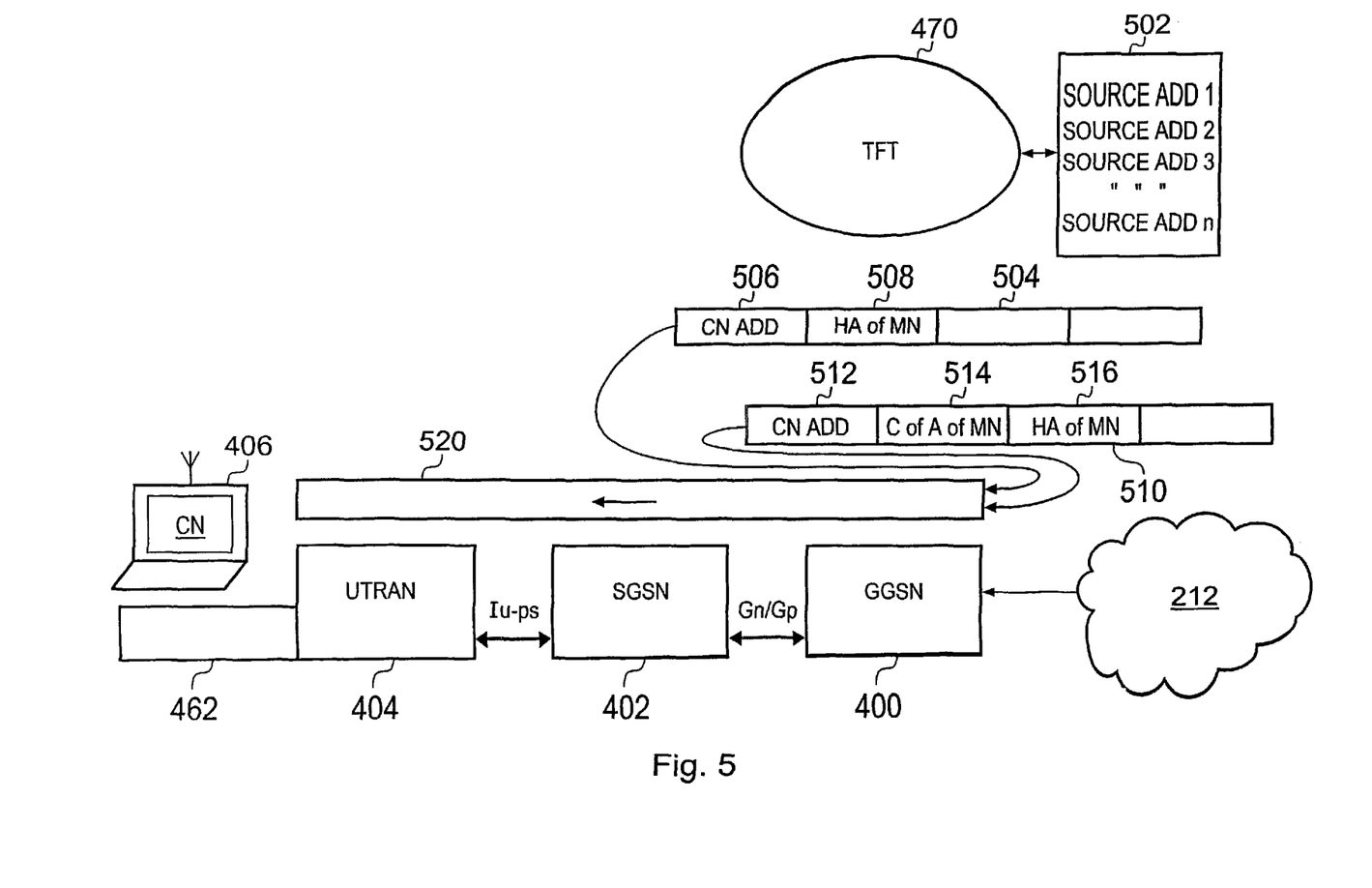
FIG. 5 is a schematic illustration of the parts shown in FIG. 4 illustrating an operation of a gateway support node to communicate down-link packets to a correspondent node.

As shown in FIG. 5 the TFT controller 500 which operates in the GGSN mobile IP layer is provided with a list of source addresses 502 which are used to control the communication of IP data packets in accordance with a source address included within the Internet packet header. The TFT 500 arranges to communicate the IP data packets via an appropriate bearer which has been set up using the packet data protocol context activation which may be initiated by an application in the UE (CN), or on the mobile node MN and is analogous to logging onto a required destination.

To select an appropriate UMTS bearer the GGSN to establish a traffic flow template in accordance with the following parameters:

IPV4 source address type
IPV6 source address type

Protocol identifier/next header type
Single destination port type
Destination port range type
Single source port type
Source port range type
Security perimeter index type
Type of service/Traffic class type
Flow level type For each PDP context to be used for a multimedia session a traffic flow template is generated by the mobile terminal and sent to the GGSN which subsequently uses this traffic flow template to filter incoming packets based on information provided in the template. For example, for packets sent from an Ipv6 mobile node, the correspondent node CN will create a traffic flow template which creates the IP address of the mobile node as the Ipv6 source address for packets in the down-link direction.

As shown in FIG. 5 an internet packet 504 received from the external packet data communications network 212 on the down-link, for communication to the CN 406 may include the address of the correspondent node CN ADD in the destination address field 506. The internet packet may include the home address of the mobile node HA of MN in the source address field 508.

In operation the TFT controller 500 checks the source address of the internet packet against the list 502 and routes the internet packet via the appropriate data bearer which has been set up within the TFT controller for communicating the Internet packet to the respective correspondent node CN. However, what happens when the mobile network roams from its home network 210 to the foreign network 212 as shown in FIG. 2?

As explained with reference to FIG. 3, following route optimisation the source address for the mobile node will be the care-of-address of the mobile node. Thus, an Internet packet 510 corresponding to the Internet packet 504 will be sent from the mobile node to the GGSN for communication to the correspondent node CN 406. As shown the IP header 510 received from the mobile node MN when attached to the foreign network 212 includes within its destination address field 512 the home address of the correspondent node CN ADD, but within its source address field 514 the care-of-address of the mobile node C of A MN. The TFT has a packet bearer, which has been set up and defined for conveying the internet packets to correspondent nodes in respect of the source address. However, the interne packet 510 received from the mobile node after it has roamed to the foreign network 212 will not be recognised by the TFT controller 500 and so the packet will be dropped, unless some adaptation of the GGSN is provided.

Use of the Hop-by-Hop Extension Header Field

A previously proposed solution disclosed in [5] for addressing the inter-working between the TFT controller 500 in the GGSN after route optimisation is to include the home address of the mobile node MN within an extension header field known as the hop-by-hop field 516. By including the home address of the mobile node within the hop-by-hop field 516, the TFT controller can identify the appropriate bearer, which should be used to convey an Internet packet to the correspondent node CN. This is the packet bearer, which was set up during a PDP context activation as part of a session initiation. Thus, if the mobile node roams to a foreign network during mid-session then by providing the home address of the mobile node in the hop-by-hop field the TFT controller 500 can identify the appropriate bearer to be used to convey the Internet packets to the CN 406. The hop-by-hop address field is also known as the routing header type two (extension to header of IP6 packets).

According to the Ipv6 specification [3], the hop-by-hop extension field must be read by each intermediate router. As such, using the hop-by-hop extension header to provide the mobile's home address, will require that each router along a path communicating the Internet packets from the mobile node to the correspondent node is required to read the mobile's home address in the hop-by-hop extension header. This requirement could represent a substantial performance degradation of the IP network, resulting from the requirement to read the mobile's home address in the hop-by-hop extension header.

Use of Router Alert Option for GGSN Information

In order to reduce a degradation in performance resulting from all routers along the communications path having to read the mobile node's home address in the hop-by-hop extension header field, an internet packet according to an embodiment of the invention includes information relating to supporting Ipv6 mobility for the GGSN, such as for example a router alert option in the hop-by-hop extension header which includes the mobile node's home address. A header for the internet packet is illustrated in FIG. 6.

Figure 6:
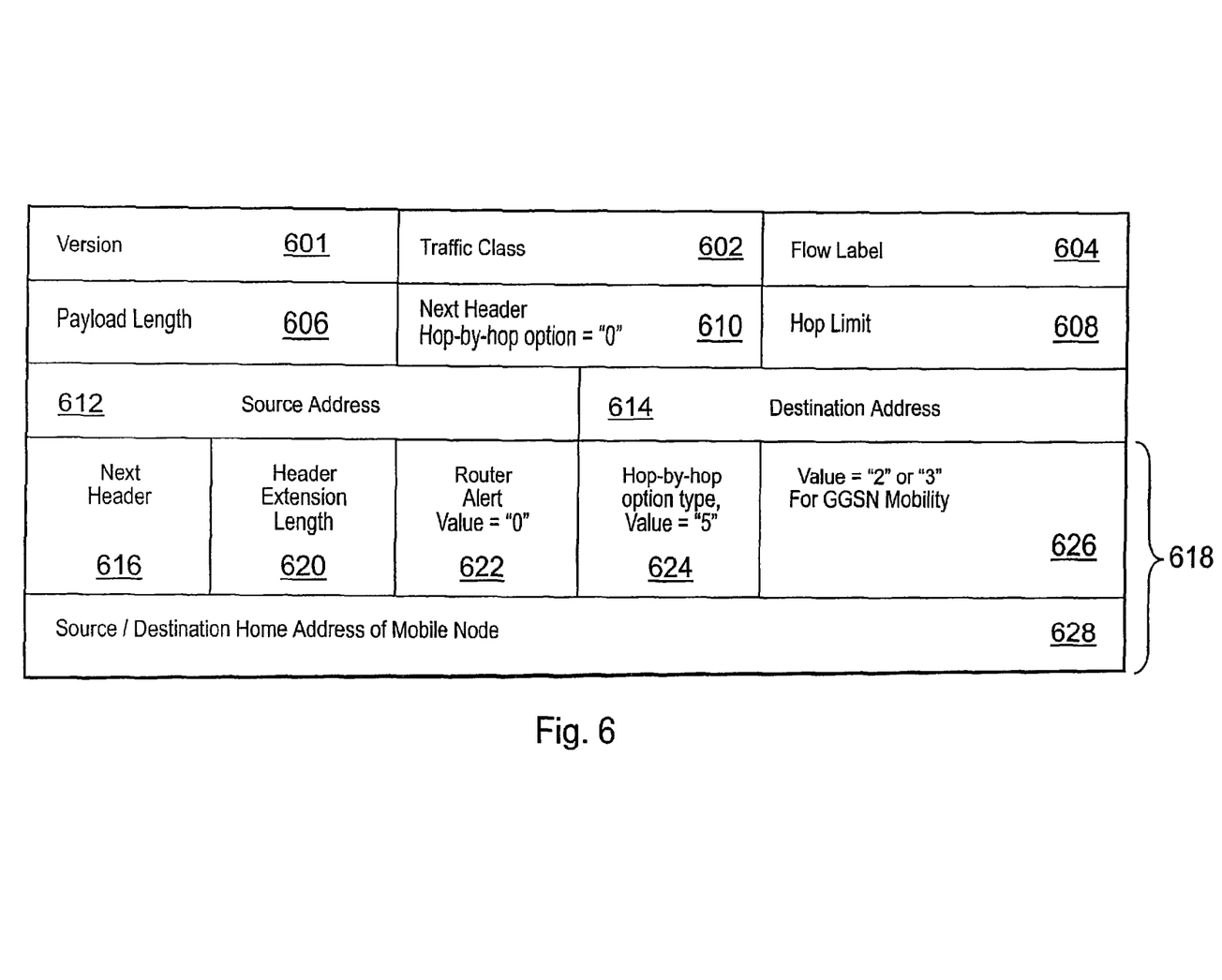
FIG. 6 is a schematic illustration of an internet packet which has been adapted to provide a router alert header as part of a hop-by-hop extension header, with a field for providing information to the GGSN of FIG. 2.

In FIG. 6, the fields "Version" 601, "Traffic Class" 602, "Flow Label" 604, "Payload Length" 606 and "Hop Limit" 608 are as specified in [3] and so will not be explained here, since the reader can refer to [3] for this information. The "Next Header" field 610 is arranged to specify that the next header to the present header provides a hop-by-hop option (with a value=0) and so must be read. The "source address" field 612 and the "destination address" field 614, provide the source and destinations addresses as explained with reference to FIG. 3.

The "Next Header" field 616 within the hop-by-hop extension header part 618 provides an indication as to whether or not a further header follows the current extension header. The field "Header Extension Length" 620 provides an indication of the length of the extended header if present.

The next fields in the IP packet are specified in accordance with the router alert option type [4]. The first of these fields provides the "Router Alert Option" field 622. The "Router Alert Option" field provides an indication that the field is for alerting routers and has a value of zero specified as three bits (000). The next field 624 provides a "hop-by-hop option type" which is set to a value of five by a field length of five bits.

The next field 626 provides a value field and is set to a value to indicate that the information in the remainder of the header is provided for the GGSN of a GPRS network. This value may be any value which has not so far been reserved in the specification [4]. For example the value may be "3". Alternatively, it may be possible to utilise a value already reserved such as "2" meaning "Datagram contains an active network message". If the definition of the value "2" permits the use of this value for mobility information for the GGSN, then this value may be re-used. Otherwise the next available value which is "3" will be used. The remaining field 628 provides the information to the GGSN.

One example of the information for the GGSN which may be provided in the field 626 is the mobile node's home address. This provides a 128-bit address field. The router alert field in contrast is only 3-bits with the "hop-by-hop option type" field being only 5-bits. As a result, since every router along the communications path must only read 3-bits to determine whether the information is relevant to the router concerned, a performance loss is substantially reduced with respect to a performance loss which may have occurred if a remaining 128-bit address field was also required to be read by every router along the communications path.

Summary of the Operation of the GGSN for TFT

In summary, by analysing the hop-by-hop field in combination with the source address field the TFT controller 500 can identify the appropriate bearer 520 to communicate the Internet packets to the correspondent node CN because the list 502 includes the home address of the mobile node. The operation of the GGSN when receiving IP packets for ingress to the packet radio network is summarised by the flow diagram of FIG. 7 and explained as follows:

S1: An internet packet according to the example in FIG. 6 is received from the external network.

Figure 7:
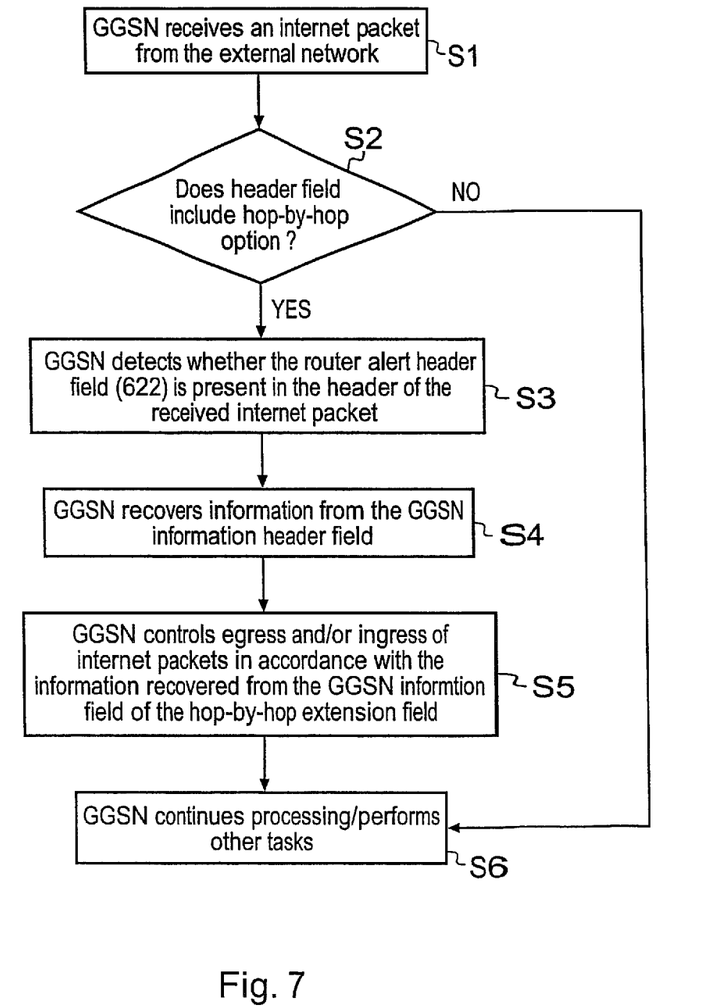
FIG. 7 is a flow diagram illustrating the operation of the gateway support node when processing an internet packet in the form illustrated by the example shown in FIG. 6 for a down-link communication.

S2: The GGSN detects whether a next header field of the internet packet includes a hop-by-hop field option. If the GGSN does detect that the next header field includes a hop-by-hop field option, then processing proceeds to step S3, and otherwise continues from step S6.

S3: If the GGSN detects the hop-by-hop extension header then at step S3 the GGSN identifies whether a router alert header type is present, within the hop-by-hop extension header field. In some embodiments this step may be omitted.

S4: In step S4, the GGSN recovers information from the field provided in the hop-by-hop extension header field providing data representing the information.

S5: The GGSN then controls egress and/or ingress of internet packets to the packet radio network in accordance with the information recovered.

S6: At step S6 the GGSN continues processing with other functions, the processing of the current packet may however continue depending on the content of the GGSN information field.

Figure 8:
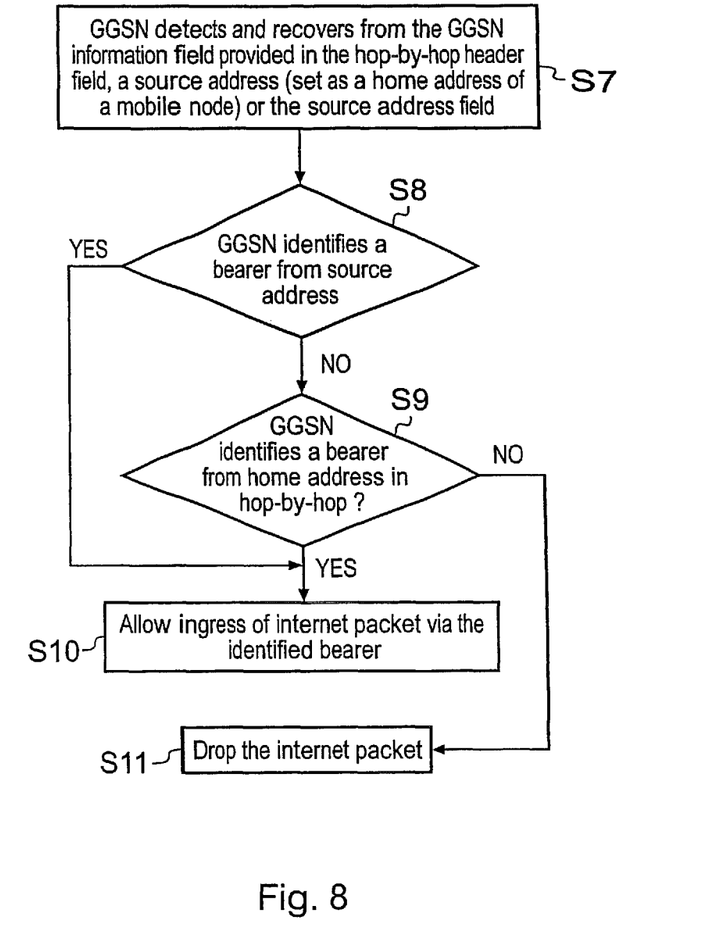
FIG. 8 is a flow diagram illustrating the operation of the gateway support node when processing an internet packet in the form illustrated by the example shown in FIG. 6 where the GGSN information field includes a source home address.

As will be appreciated one of the uses of the field in the hop-by-hop extension header field is to provide a mobile node's home address as source address, so that the TFT can identify the appropriate bearer for communicating the internet packet to the correspondent node. For this example embodiment the GGSN operates as represented by the flow diagram in FIG. 8 and explained as follows:

S7: The GGSN detects, from either the data provided in the hop-by-hop extension header field for the gateway support node, or the source address of the internet packet, a source home address of a mobile node communicating the internet packets.

S8: The GGSN determines whether the source address of the internet packet identifies the packet data bearer for communicating the internet packets to a correspondent node attached to the packet radio network. If the source address does correspond to a packet data bearer then processing proceeds to step S10, otherwise processing proceeds to step S9.

S9: The GGSN determines whether the home address provided in the GGSN information field identifies the packet data bearer for communicating the internet packets to a correspondent node attached to the packet radio network. If the home address does correspond to a packet data bearer then processing proceeds to step S10, otherwise at step S11 the packet is dropped.

S10: The GGSN allows ingress of the internet packets via the identified packet data bearer, or S11: The GGSN drops the internet packet.

Summary of Router Operation

As will be appreciated, routers along a communications path between the mobile node and the correspondent node may now operate according to the standard, without being required to read the entire hop-by-hop extension header. This is because the router only needs to read as far as the router alert option field an ignore the remainder to the hop-by-hop extension header.

Figure 9:
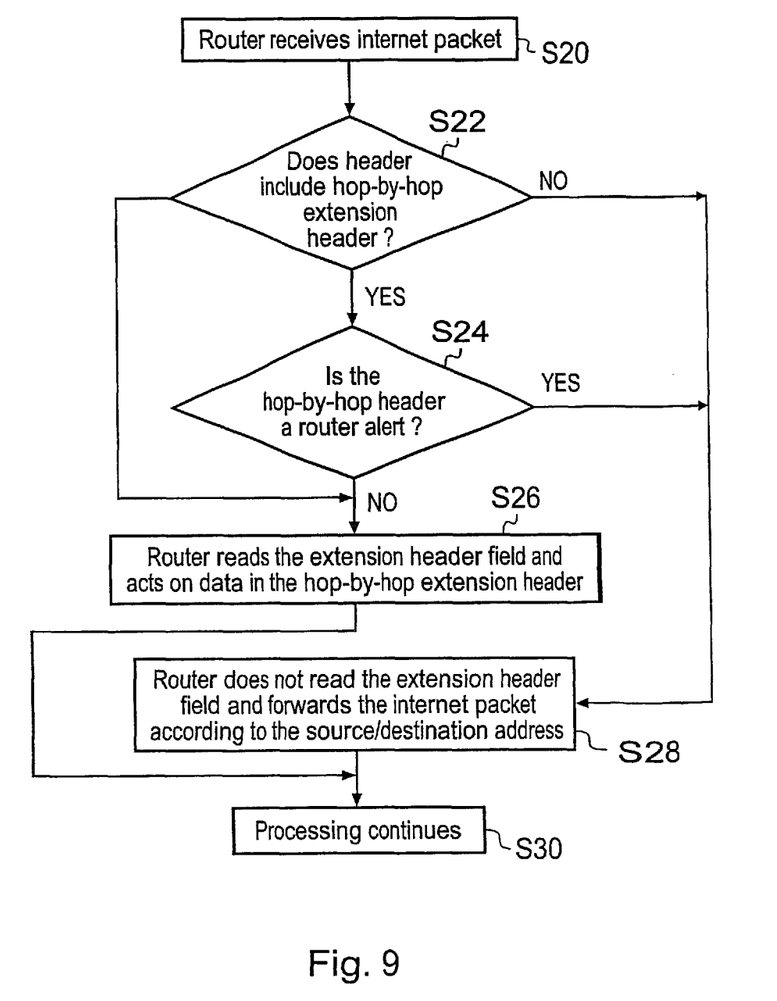
FIG. 9 is a flow diagram illustrating the operation of a router when processing an internet packet in the form illustrated by the example shown in FIG. 6.

In summary, a router may handle the internet packet according to FIG. 6 as summarised in FIG. 9 and explained as follows:

S20: The router receives the internet packet in accordance with the example illustrated in FIG. 6.

S22: The router detects whether or not a next header field of the internet packet includes a hop-by-hop field option. If not then at step S28, the router processes the internet packet as usual based on the source and destination addresses in the un-extended header.

S24: If the router detects that the hop-by-hop extension header is present, then the router determines whether a router alert header type is present within the hop-by-hop extension header field, by reading the router alert field (3-bits according to Ipv6 [4]). If the router alert header is present then processing proceeds to step S28 and the router does not read the extension header field.

S26: If the router alert header is not detected then, the hop-by-hop extension header is read by the router and processes the header accordingly.

S28: If the router alert header is detected or there is no hop-by-hop extension header field present, then the router forwards the internet packet in accordance with the destination address and does not read further the content of the hop-by-hop extension field.

S30: Processing of internet packets by the router continues.

Inter-Working Mobile IPV6 with SBLP of IMS in GPRS/UMTS

Figure 10:
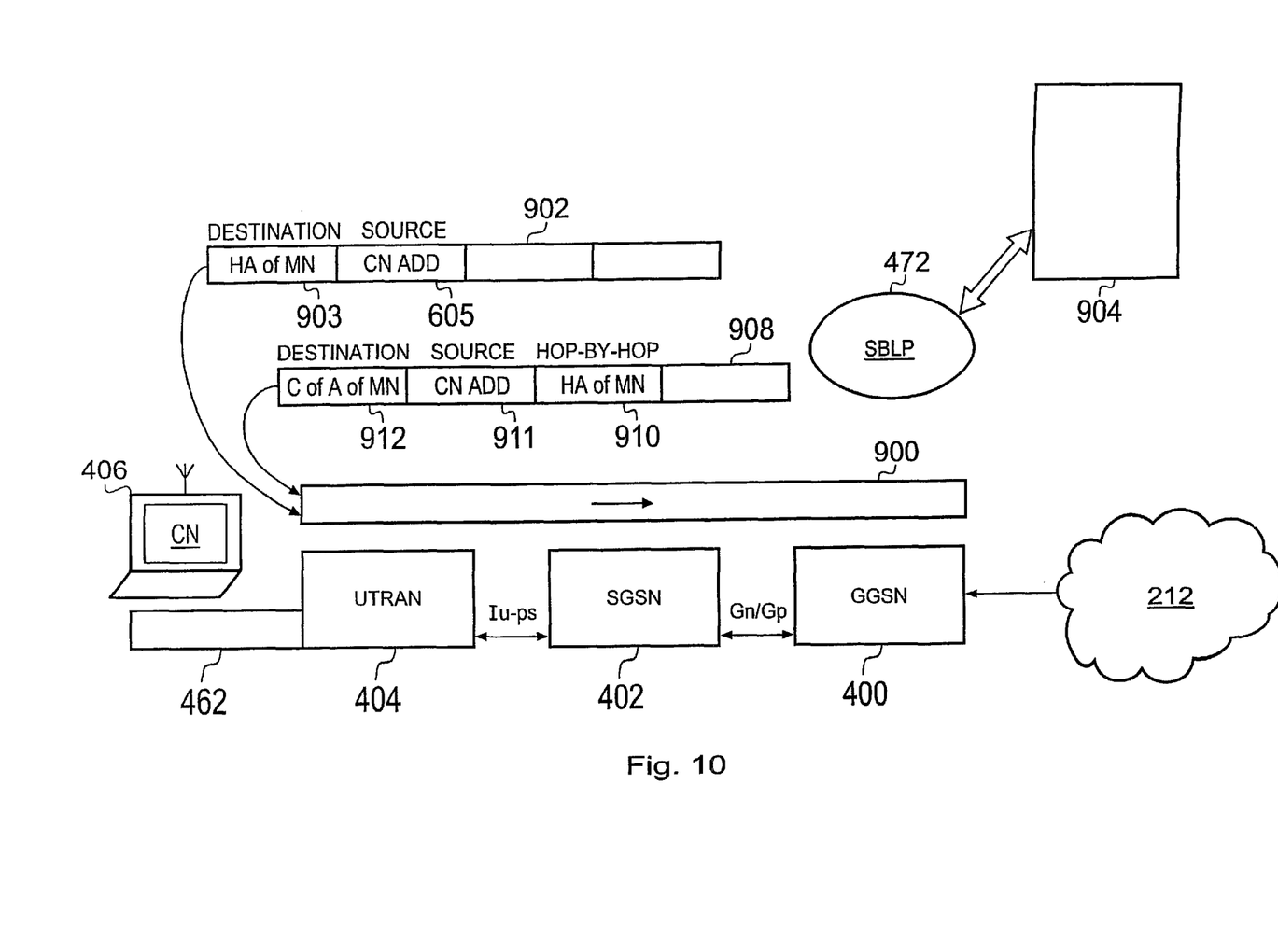
FIG. 10 is a schematic illustration of the parts shown in FIG. 4 illustrating an operation of a gateway support node for an up-link communication.

FIG. 10 provides a simplified diagram of parts of the GPRS/UMTS network shown in FIG. 4 and configured for communicating data packets on the up-link from the correspondent node CN to the mobile node MN as previously discussed with reference to FIG. 5 for down-link communications.

In FIG. 10 a bearer 900 which was initiated by the correspondent node CN using a PDP context activation is provided for up-link communications to the mobile node MN. An example of an Internet packet header 902 communicated with an Internet packet on the up-link is sent using the bearer 900 through the UTRAN 404, the SGSN 402 to the GGSN 400 and outward to the foreign network 212. However, within the GGSN 400, the SBLP is provided in order to police access by the CN (mobile user equipment) to the quality of service resources in the UMTS network and further out into the external packet data communications network 212. The SBLP 472 operates to effect a policy function as a policy decision point or policy enforcement point in order to prevent theft of service attacks by unscrupulous parties. For example, an unscrupulous party may wish to gain access to IP multimedia subsystem services (IMS) even though the party has not subscribed to the services. As such, unless the GGSN can recognise a legitimate destination address, then the packet will be dropped. The destination address is a legitimate address established when the IP session was set up. For the mobile node, this will be the home address.

By using the internet packet according to the example shown in FIG. 6 for up-link communications, in which the destination mobile's home address is provided in the hop-by-hop extension header, the internet packet will be allowed to egress from the GGSN in accordance with the SBLP function.

Again, by providing the home address as part of a router alert option header, a potential performance penalty which may result for routers within the network having to read the hop-by-hop field may be reduced.

Figure 11:
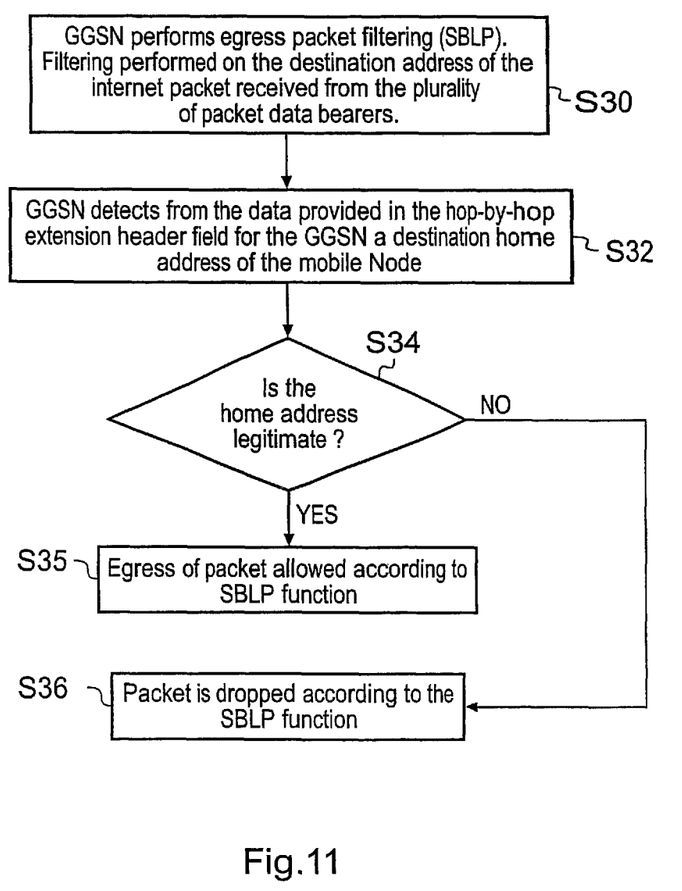
FIG. 11 is a flow diagram illustrating the operation of the gateway support node when processing an internet packet in the form illustrated by the example shown in FIG. 6 for an up-link communication.

The operation of the GGSN in accordance with an egress of packets from the GPRS network is illustrated in FIG. 11 and summarised as follows:

S30: The GGSN perform egress packet filtering in accordance with a destination address of internet packets received from the plurality of packet data bearers. Egress of internet packets is allowed for internet packets having a legitimate destination address in accordance with a Service Based Local Policy (SBLP) function.

S32: Upon receipt of the internet packet illustrated in FIG. 6, the GGSN detects from the data provided in the hop-by-hop extension header field for the gateway support node a destination home address of a mobile correspondent node which is to be the destination of the internet packets.

S34: If the hop-by-hop extension header field contains a legitimate destination home address, then at step S35 egress of internet packets is allowed. Otherwise at step S36 the internet packet is dropped.

Various further aspects and features of the present invention are defined in the appended claims. Various modifications can be made to the embodiments herein described without departing from the scope of the present invention.

REFERENCES

[1] D. Johnson, C. Parkins, J. Arkko, "Mobility in Ipv6", Internet Draft, Internet Engineering Task Force, 20 Jan. 2003.
[2] R. Steele, C-C Lee and P. Gould, "GSM, cdmaOne and 3G Systems," published by Wiley International ISBN 0 471 491853
[3] S. Deering and R. Hinden, "Internet Protocol (Version 6 (IPv6) Specification, Request for Comments 2460, Ipv6 standards document, www.ietf/org/rfc/rfc2460.txt
[4] C. Pathidge and A. Jackson, Ipv6 Router Alert Option, Request for Comments 2711, Ipv6 standards document, www.ietf/org/rfc/rfc2711.txt
[5] UK Patent application numbers 0226289.7, 0222187.7, 0230336.0, 0222161.2, 0230335.2.

ANNEX 1

GPRS/UMTS Architecture

The terminology and architecture used in FIG. 1 corresponds to that used for the UMTS and that proposed for 3G as administered by the 3GPP, more details for which may be found in [1]. In FIG. 1, a Gateway GPRS Support Node (GGSN) is connected to an external Packet Data Network 102, (PDN). The external PDN communicates as packets using the Internet Protocol (IP). An interface 104 between the GGSN and the external network is labelled Gi which has been standardised although further aspects are being standardised. Also connected to the GGSN is a Serving GPRS Support Node (SGSN) 106 via an interface 108 labelled as Gn/Gp which is also being standardised.

The GGSN and the SGSN are two of network components, which are required to support GPRS. The GGSN acts as the gateway between the external packet data networks (PDN) and the mobile network, which supports GPRS. The GGSN contains sufficient information to route incoming IP data packets to the SGSN that is serving a particular User Equipment (UE) which is mobile and receives data via a radio access facility provided by the mobile packet radio network. For the example embodiment the radio access facility is provided in accordance with the Universal Terrestrial Radio Access Network (UTRAN) system which is specified in accordance with the 3GPP standard. The SGSN is connected to the GGSN via a Gn interface if the SGSN is within the same Public Land Mobile Network (PLMN), and connected via the Gp interface to GGSNs belonging to other PLMNs.

An SGSN provides mobility management of UEs which are moving within an area supported by the mobile radio network. To this end the SGSN is provided with access to a Home Location Register (HLR) 110. The SGSN is arranged to route data packets to Radio Network Controllers (RNC) 112, 114 for communication via the UTRAN radio access facility to mobile users UE 116, 118. The UTRAN radio access facility is provided using Node B apparatus 120, 122, 124, 126, 128, which effectively form base stations providing radio coverage for the area served by the mobile telecommunications network. The interface 130, 132, 134, 136, 138 between each RNC 112, 114 and the Node B apparatus 120, 122, 124, 126, 128, are labelled Iub and conform to an established or evolving standard. Similarly the interfaces 140, 142 between the SGSN and each RNC 112, 114 are labelled as Iu-ps and is an evolving standard.

The invention claimed is:

1. A gateway support node (GGSN) comprising one or more receivers and one or more controllers, the gateway support node configured to:
    provide an interface between an external packet data communications network and a packet radio network, the packet radio network providing a plurality of packet data bearers for communicating Internet packets with nodes attached to the packet radio network, each of the packet data bearers being defined with respect to a source home address of nodes communicating the Internet packets, the gateway support node (GGSN) being operable upon receipt of the Internet packet,
    to detect that a next header field of the Internet packet includes a hop-by-hop extension header, and
    to detect a router alert option header in the hop-by-hop extension header, and a value field indicating that the remainder of the hop-by-hop extension header is provided for the gateway support node, and upon detecting the value field indicating that the remainder of the hop-by-hop extension header field is for the gateway support node,
    to recover information from a field provided in the remainder of the hop-by-hop extension header for use in controlling egress and/or ingress of Internet packets to the packet radio network in accordance with the information, wherein
    the gateway support node is operable
    to control ingress of Internet packets from the external communications network to the packet data bearers of the packet radio network, by
    detecting from the information field provided in the remainder of the hop-by-hop extension header a source home address of a mobile correspondent node communicating the Internet packets,
    using the source home address of the mobile correspondent node to identify the packet data bearer for communicating the Internet packets to a correspondent node attached to the packet radio network, and
    allowing ingress of the Internet packets to the identified packet data bearer.
2. A gateway support node as claimed in claim 1, the gateway support node being operable to allow ingress of the Internet packets if either the address in the source address field of the Internet packet or the address provided in the field in hop-by-hop extension header for the gateway support node corresponds to a packet data bearer.

3. A gateway support node as claimed in claim 1, the gateway support node being operable to perform egress packet filtering in accordance with a destination address of the Internet packets received from the plurality of packet data bearers, egress of the Internet packets being allowed for Internet packets having a legitimate destination address, and upon receipt of the Internet packet, to detect from the information data provided in the hop-by-hop extension header field for the gateway support node a destination home address of a mobile node which is to be the destination of the Internet packets, and to allow egress of the Internet packets if the gateway support node recognizes the destination home address as a legitimate home address.

4. A gateway support node as claimed in claim 3, the gateway support node being operable to allow egress of the Internet packets if either the address in the destination address field of the packet or the address provided in the hop-by-hop extension header for the gateway support node is a legitimate destination address.

5. A gateway support node as claimed in claim 1, wherein the gateway support node is operable as a Gateway GPRS Support Node (GGSN), according to the General Packet Radio System standard.

6. A packet radio network operable to communicate Internet packets between an external packet data network and nodes associated with the packet radio network, the packet radio network providing a plurality of packet data bearers for communicating the Internet packets to and/or from the nodes attached to the packet radio network, the packet radio network including a gateway support node as claimed in claim 1.

7. A packet radio network as claimed in claim 6, wherein the packet radio network is operable in accordance with the General Packet Radio System (GPRS) standard, the gateway support node being a Gateway GPRS Support Node (GGSN).

8. A method of operating a gateway support node to interface between an external packet data communications network and a packet radio network, the packet radio network providing a plurality of packet data bearers for communicating Internet packets with nodes attached to the packet radio network, each of the packet data bearers being defined with respect to a source home address of the nodes communicating the Internet packets, the method comprising receiving an Internet packet, detecting that a next header field of the Internet packet identifies that an extension header includes a hop-by-hop extension header, detecting a router alert option header and a value field in the hop-by-hop extension header indicating that the remainder of the hop-by-hop header is provided for the gateway support node, and upon detecting the value field indicating that the remainder of the hop-by-hop extension header field is for the gateway support node, recovering from a field provided in the remainder of the hop-by-hop extension header information for use in controlling egress and/or ingress of Internet packets to the packet radio network in accordance with the information, wherein, the controlling the ingress of Internet packets from the external communications network to the packet data bearers of the packet radio network in accordance with the information, includes detecting from the information field provided in the remainder of the hop-by-hop extension header field a source home address of a mobile correspondent node communicating the Internet packets, using the source home address of the mobile node to identify the packet data bearer for communicating the Internet packets to a correspondent node attached to the packet radio network, and allowing ingress of the Internet packets to the identified packet data bearer, and otherwise dropping the Internet packet.

9. A method as claimed in claim 8, the method comprising performing egress packet filtering in accordance with a destination address of Internet packets received from the plurality of packet data bearers, egress of Internet packets being allowed for Internet packets having a legitimate destination address, and upon receipt of the Internet packet, detecting from information provided in the remainder of the hop-by-hop extension header field for the gateway support node a destination home address of a mobile node which is to be the destination of the Internet packets, and allowing egress of Internet packets if the gateway support node recognises the destination home address as a legitimate home address.

10. An apparatus comprising a mobile node and a gateway support node, the mobile node configured to send an Internet packet comprising a header field, the header field including a field identifying a source address of the Internet packet, a field identifying a destination address of the Internet packet, and a next header field identifying whether an extension header follows the header and a type of the extension header, the next header field identifying that the extension header includes a hop-by-hop extension header, the hop-by-hop extension header including a router alert option header indicating that the remainder of the hop-by-hop extension header is optional for a router to read, and a value field indicating that the remainder of the hop-by-hop header is provided for the gateway support node of a packet radio network, the remainder of the hop-by-hop extension header including a home address of the mobile node, the mobile node which was communicating Internet packets with a correspondent node attached to the packet radio network having roamed to a foreign network, the source address field comprising an address to be used to access the mobile node via the foreign network, the Internet packet being communicated by the gateway support node to the correspondent node, the gateway support node being configured to interface between an external packet data communications network and the packet radio network, the packet radio network providing a plurality of packet data bearers for communicating the Internet packets with nodes attached to the packet radio network, each of the packet data bearers being defined with respect to a source home address of the nodes communicating the Internet packets, detect the next header field of the Internet packet identifying that an extension header includes the hop-by-hop extension header, detect the router alert option header and the value field in the hop-by-hop extension header indicating that the remainder of the hop-by-hop header is provided for the gateway support node, and upon detecting the value field indicating that the remainder of the hop-by-hop extension header field is for the gateway support node, recover from the field provided in the remainder of the hop-by-hop extension header information for use in controlling egress and/or ingress of Internet packets to the packet radio network in accordance with the information, wherein, the controlling the ingress of Internet packets from the external communications network to the packet data bearers of the packet radio network in accordance with the information, includes detecting from the information field provided in the remainder of the hop-by-hop extension header field the source home address of the mobile node communicating the Internet packets, using the source home address of the mobile node to identify the packet data bearer for communicating the Internet packets to the correspondent node attached to the packet radio network, and allowing ingress of the Internet packets to the identified packet data bearer, and otherwise dropping the Internet packet.

11. A non-transitory computer readable medium storing a computer program providing computer executable instructions forming a computer program to be executed by a data processor within a computer to perform actions comprising:

sending an Internet packet comprising a header field, the header field including a field identifying a source address of the Internet packet, a field identifying a destination address of the Internet packet, and a next header field identifying whether an extension header follows the header and a type of the extension header, the next header field identifying that the extension header includes a hop-by-hop extension header, the hop-by-hop extension header including a router alert option header indicating that the remainder of the hop-by-hop extension header is optional for a router to read, and a value field indicating that the remainder of the hop-by-hop header is provided for a gateway support node of a packet radio network, the remainder of the hop-by-hop extension header including a home address of the mobile node, the mobile node which was communicating Internet packets with a correspondent node attached to the packet radio network having roamed to a foreign network, the source address field comprising an address to be used to access the mobile node via the foreign network.

12. An apparatus comprising a mobile node and a gateway support node, the mobile node configured to send an user data packet comprising a header field, the header field including a field identifying a source address of the user data packet, a field identifying a destination address of the user data packet, and a next header field identifying whether an extension header follows the header and a type of the extension header, the next header field identifying that the extension header includes a hop-by-hop extension header, the hop-by-hop extension header including a router alert option header indicating that the remainder of the hop-by-hop extension header is optional for a router to read, and a value field indicating that the remainder of the hop-by-hop header is provided for the gateway support node of a packet radio network, the remainder of the hop-by-hop extension header including a home address of the mobile node, the mobile node which was communicating user data packets with a correspondent node attached to the packet radio network having roamed to a foreign network, the source address field comprising an address to be used to access the mobile node via the foreign network, the user data packet being communicated by the gateway support node to the correspondent node, the gateway support node being configured to interface between an external packet data communications network and the packet radio network, the packet radio network providing a plurality of packet data bearers for communicating the user data packets with nodes attached to the packet radio network, each of the packet data bearers being defined with respect to a source home address of the nodes communicating the user data packets, detect the next header field of the user data packet identifying that an extension header includes the hop-by-hop extension header, detect the router alert option header and the value field in the hop-by-hop extension header indicating that the remainder of the hop-by-hop header is provided for the gateway support node, and upon detecting the value field indicating that the remainder of the hop-by-hop extension header field is for the gateway support node, recover from the field provided in the remainder of the hop-by-hop extension header information for use in controlling egress and/or ingress of user data packets to the packet radio network in accordance with the information, wherein, the controlling the ingress of user data packets from the external communications network to the packet data bearers of the packet radio network in accordance with the information, includes detecting from the information field provided in the remainder of the hop-by-hop extension header field the home address of the mobile node communicating the user data packets, using the home address of the mobile node to identify the packet data bearer for communicating the user data packets to the correspondent node attached to the packet radio network, and allowing ingress of the user data packets to the identified packet data bearer, and otherwise dropping the user data packet.

13. A non-transitory computer readable medium storing a computer program providing computer executable instructions forming a computer program to be executed by a data processor within a computer to perform actions comprising:

sending a user data packet comprising a header field, the header field including a field identifying a source address of the user data packet, a field identifying a destination address of the user data packet, and a next header field identifying whether an extension header follows the header and a type of the extension header, the next header field identifying that the extension header includes a hop-by-hop extension header, the hop-by-hop extension header including a router alert option header indicating that the remainder of the hop-by-hop extension header is optional for a router to read, and a value field indicating that the remainder of the hop-by-hop header is provided for a gateway support node of a packet radio network, the remainder of the hop-by-hop extension header including a home address of the mobile node, the mobile node which was communicating user data packets with a correspondent node attached to the packet radio network having roamed to a foreign network, the source address field comprising an address to be used to access the mobile node via the foreign network.

* * * * *